(12) United States Patent
Boldt et al.

(10) Patent No.: US 7,086,598 B2
(45) Date of Patent: Aug. 8, 2006

(54) CHIPCARD-ACCOMMODATING UNIT

(75) Inventors: Matthias Boldt, Constance (DE); Klaus Hug, Oberndorf (DE)

(73) Assignee: Siemens AG, München (DE)

( * ) Notice: Subject to any disclaimer, the term of this patent is extended or adjusted under 35 U.S.C. 154(b) by 149 days.

(21) Appl. No.: 10/831,221

(22) Filed: Apr. 26, 2004

(65) Prior Publication Data
US 2004/0232233 A1 Nov. 25, 2004

Related U.S. Application Data

(63) Continuation of application No. PCT/DE02/03818, filed on Oct. 10, 2002.

(30) Foreign Application Priority Data
Nov. 2, 2001 (DE) .................. 101 53 995

(51) Int. Cl.
*G66K 7/00* (2006.01)
(52) U.S. Cl. .................................. 235/486
(58) Field of Classification Search ................ 235/486
See application file for complete search history.

(56) References Cited

U.S. PATENT DOCUMENTS

| 4,724,310 A | 2/1988 | Shimamura et al. |
| 5,879,175 A * | 3/1999 | Muramatsu et al. ........ 439/159 |
| 6,254,005 B1 * | 7/2001 | Smith et al. ............... 235/486 |
| 6,464,143 B1 * | 10/2002 | Oki et al. .................. 235/475 |

FOREIGN PATENT DOCUMENTS

| DE | 44 45 537 A1 | 6/1996 |
| DE | 195 45 502 C1 | 6/1997 |
| DE | 200 18 694 U1 | 4/2001 |
| EP | 1 118 958 A1 | 7/2001 |

OTHER PUBLICATIONS

Derwent-Abstract; DE 44 45 537A1; Jun. 27, 1996; Karlheinz Bauer, D-81673 München.
Derwent-Abstract; DE 195 45 502C1; Jun. 26, 1997; National Rejectors, Inc., D-21614 Buxtehude.
Derwent-Abstract; DE-20018694U1; Apr. 12, 2001; Mannesmann VDO AG, D-60388 Frankfurt.
Derwent-Abstract; EP 1 118 958A1; Jul. 25, 2001; Molex Inc., US-Lisle Illinois 60532.

* cited by examiner

*Primary Examiner*—Daniel St. Cyr
(74) *Attorney, Agent, or Firm*—Siemens AG

(57) ABSTRACT

The present invention relates to a chipcard housing unit having a locking element which may be displaced parallel to the displacement plane of a chipcard. Individual locking elements are provided, mounted such as to be displaced between a cardholder and a control slide mounted thereon. Locking pins, provided on the locking element, engage in guides formed in the control slide. The ends of the locking elements are bent in a suitable manner, preferably hooked, and surround the front face of a chipcard located in the read/write position.

15 Claims, 5 Drawing Sheets

CHIPCARD-ACCOMMODATING UNIT

CROSS SECTION TO RELATED APPLICATIONS

Figure 1:
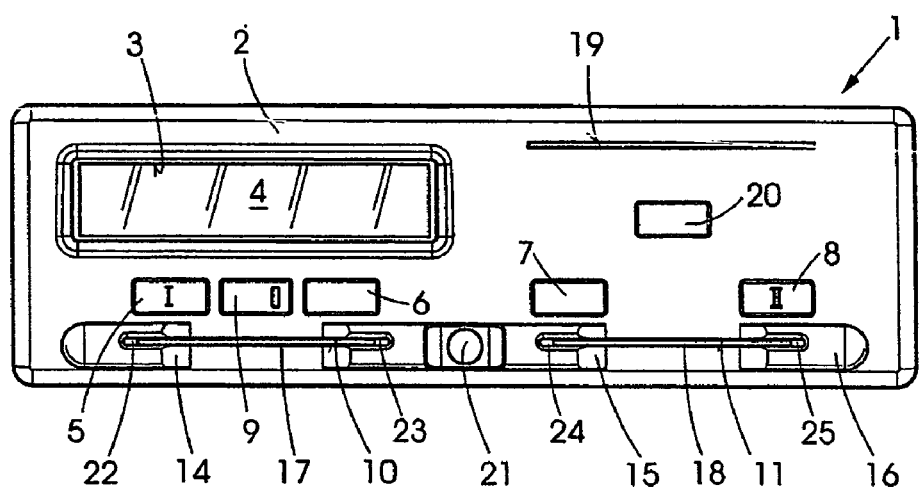

The present application is a continuation of international application number PCT/DE02/03818, filed Oct. 10, 2002, which claimed the United States, and further claims priority to priority document 101 53 995 9, filed Nov. 2, 2001, the both of which are herein incorporated by reference.

BACKGROUND OF THE INVENTION

The present invention relates to a chipcard-accommodating unit having a card holder which guides the chipcards and locking means which can be actuated by a chipcard when it is introduced into the accommodating unit.

Chip cards may be used for recording a person's working and resting times. Such times are important when applied to, for example, commercial vehicle drivers. Such times are often required for documentation purposes, the times being provided in a secure and reliable manner. Accordingly, fraud, interference and the like are avoided.

A possible source of such undesired activity is between a data-recording device and a chip card. However, the space conditions, in particular as far as the overall depth in the haptic area of the drivers is concerned, are limited to a considerable extent in the commercial vehicle, so that realizing a relatively long transporting path, if appropriate also a change in direction during the transportation of a chipcard, as a safeguarding measure is not possible either in a tachograph containing a corresponding accommodating unit for chipcards or in an autonomous chipcard-unit configuration.

In the cases in which the chip card is preliminary inserted by hand, i.e. until the chipcard strikes against a stop in the reading/writing position, it is possible or there is only a relatively short transporting path available for automatic transportation, it is necessary to provide securing means by which a chipcard located in the relevant accommodating unit is locked, such that it cannot be manipulated at the front.

It is the case here, in particular if the introduction of a chipcard into the reading/writing position takes place exclusively by hand, that, in relation to the front surface of a tachograph or of a similar device or of an installation wall in which an autonomous chipcard unit is installed, it is necessary for the chipcard which is to be introduced to be recessed to a sufficient depth. Likewise, a suitable introduction hollow for the card must be provided. On the other hand, apart from the fact that the securing means are also intended to be esthetically pleasing, the installation situation and the space conditions, for example in the driver's cab of a motor vehicle, make it necessary for the introduction hollow to be designed to be as wide as possible in order that a chipcard can also be introduced without one having to look directly at the introduction hollow, i.e. merely by feel. This makes it necessary to rule out malfunctioning on account of collisions with the securing means if a chipcard is introduced at a certain angle in relation to the position of the guide which is assigned to the chipcards in an accommodating unit.

In known and generic chipcard-accommodating units, it is customary to raise a locking element, or to power up a locking mechanism, by means of a chipcard which is to be introduced, to raise locking elements or to charge energy stores serving for locking purposes, to be precise with the chipcard introduced to the extent where it is provided with only insufficient guidance, if any at all, with the result that a chipcard can only be introduced if a significant amount of care is paid to this task. Such chipcard-accommodating units are not suitable for the desired purpose, which also envisages "blind introduction" of a chipcard. Moreover, the locking elements or flaps which are provided for safeguarding access to an introduced chipcard in the case of known accommodating units, and can be pivoted or displaced in the direction of the vertical axis of an accommodating unit, require a relatively high installation space and, at least in part, considerable production and assembly outlay. The latter is unacceptable, in particular for use of chipcard-accommodating units in commercial vehicles, where it is necessary to ensure that components which are as straightforward as possible, and can be produced with comparatively low outlay, are assembled in a manner which is compatible with mass production.

SUMMARY OF THE INVENTION

With the inclusion of the abovementioned suitability for mass production, the object is thus to provide a chipcard-accommodating unit which is also sufficiently robust for use in commercial vehicles, provides functional reliability and reliable safeguarding against manipulation and allows, in particular, straightforward and interference-free introduction of a chipcard.

The set object is achieved in that a plate-like control slide, which can be displaced by means of a chipcard, is mounted on the card holder, and in that the control slide engages, in terms of gearing, with at least one locking element mounted on the card holder, the locking element being designed, and mounted, such that it can be moved in a plane parallel to the movement plane of the control slide and engages, by way of an integrally formed tongue, in the movement plane of the chipcard.

A further development of the solution found is characterized in that the locking element is designed as a component which has an essentially flat profile and at one end of which the tongue is integrally formed, in that the locking element has means provided for mounting it on the card holder, and in that the locking element is provided with a carry-along pin, which is assigned a guide slot formed in the control slide.

A preferred exemplary embodiment provides that two locking elements are provided, and that guide slots, which are formed in the control slide and are each assigned to a locking element, are configured such that the locking elements move in opposite directions when the control slide is moved, that, furthermore, each locking element is assigned a spring element, that, moreover, one end of the locking element is designed in a hook-like manner such that it engages around the end side of a chipcard located in the reading/writing position, and that each locking element is provided with guide pins which are fitted on the opposite side of the carry-along pin, and grooves assigned to the guide pins are formed in the card holder such that the locking elements can be moved transversely to the movement direction of the control slide.

Further expedient configurations of the invention describe the subclaims which have not been cited, and can be gathered from the description of the drawings of the selected exemplary embodiment.

The invention provides the advantage of straightforward handling, i.e. at least in the initial phase of introducing a chipcard into the accommodating device merely a small amount of friction-induced, possibly deliberately adjusted force or handling resistance is necessary, and it is only when a chipcard which is to be introduced has been guided to a sufficient extent in the relevant card shaft that the locking elements are actuated in the "closing" direction and thus a greater amount of force is necessary. In this case, the spring legs which are assigned to the locking elements, and serve essentially for securing, and stopping vibration of, the control slide and the locking elements in the respective end positions, but are not absolutely necessary for the functioning of the locking principle, act in the same direction, i.e. they assist the closing operation. It should also be pointed out that the control slide, in order to be fixed in the "open position" of the chipcard-accommodating unit, may be assigned, for example, a snap-in ball locking mechanism and the grooves which guide the locking elements may be designed such that the locking elements are pivoted against the end side of a chipcard located against the stop.

A further critical advantage of the invention can be seen in the fact that, as a result of the locking elements moving in a plane parallel to the chipcard-introduction plane, it is possible to achieve a minimum overall height, in particular if the locking elements are mounted in a recessed manner in the card holder and the control slide is assigned to the card holder in a virtually play-free manner. Furthermore, the function of the locking elements according to the invention, and the arrangement thereof, allows collision-free introduction of the chipcard into the card shaft of the accommodating unit and also a relatively long introduction hollow, without the locking elements being freely accessible in the closed position. Additionally advantageous, in particular in respect of attempts at manipulation, is the fact that the locking elements are designed such that they engage in a hook-like manner around an introduced chipcard and the fact that the locking elements are mounted at two points in the card holder, that is to say such that they can be displaced but not rotated, and, in the case of an attempt to achieve displacement from the outside, self-locking takes effect. It is also, of course, conceivable in the context of the invention to have a solution with just one locking element, with correspondingly restricted safeguarding against manipulation, or locking elements which move in the manner of scissors or tongs, the latter involving higher assembly outlay and being safeguarded against manipulation to a lesser extent than the selected exemplary embodiment. The relatively long introduction hollow, on the other hand, allows single-handed introduction of a chipcard, to be precise without one having to look directly at the guide slit. A further significant factor is that the chipcard-accommodating unit comprises a relatively small number of easily reproducible components which merely require joining connections for assembly purposes, for example all that is required is for the locking elements to be positioned in the recesses provided in the card holder in order then to be mounted indirectly, i.e. once the control slide has been fitted, in a functional manner, to be precise with a high level of functional reliability.

It is also worth mentioning that the locking mechanism according to the invention, in a suitable modification, can also be used in a chipcard-accommodating unit in which the chipcards are transported automatically into the reading/writing position.

In respect of the abovementioned force requirement, it is also important, in the case of the solution according to the invention, for the spring legs to be subjected to stressing when a chipcard which is located in the reading/writing position is displaced into the removal position, rather than when a chipcard is introduced, a push rod which is moved by a motor interacting with the control slide following button confirmation.

DETAILED DESCRIPTION OF THE SEVERAL VIEWS OF THE DRAWINGS

Figure 2:
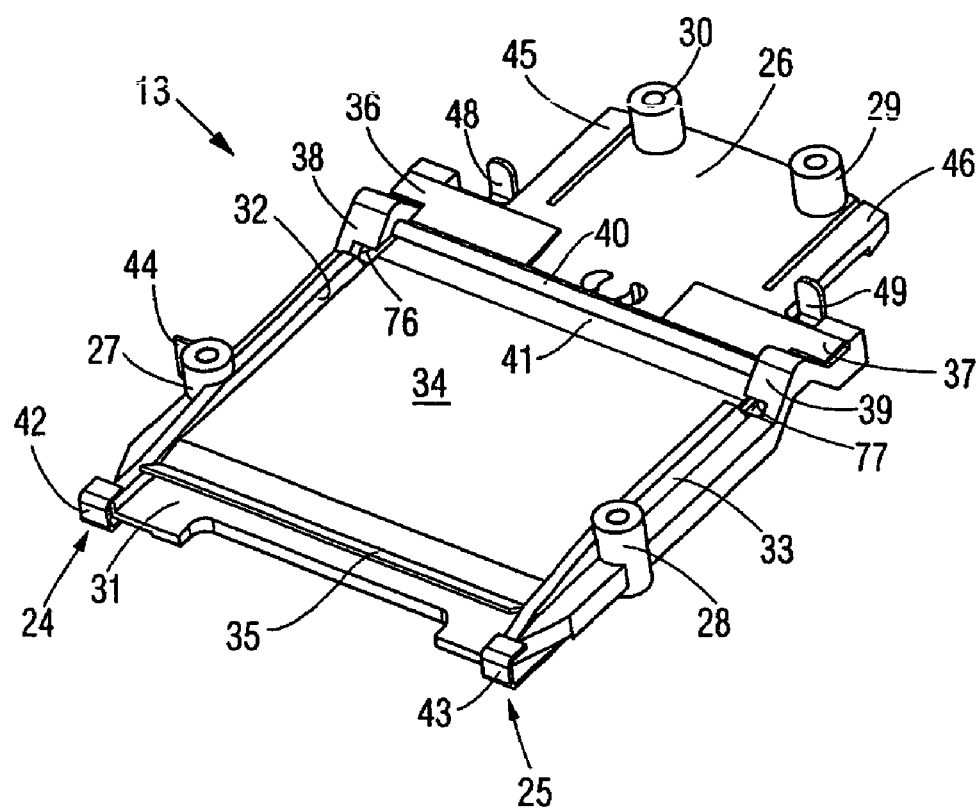
Figure 3:
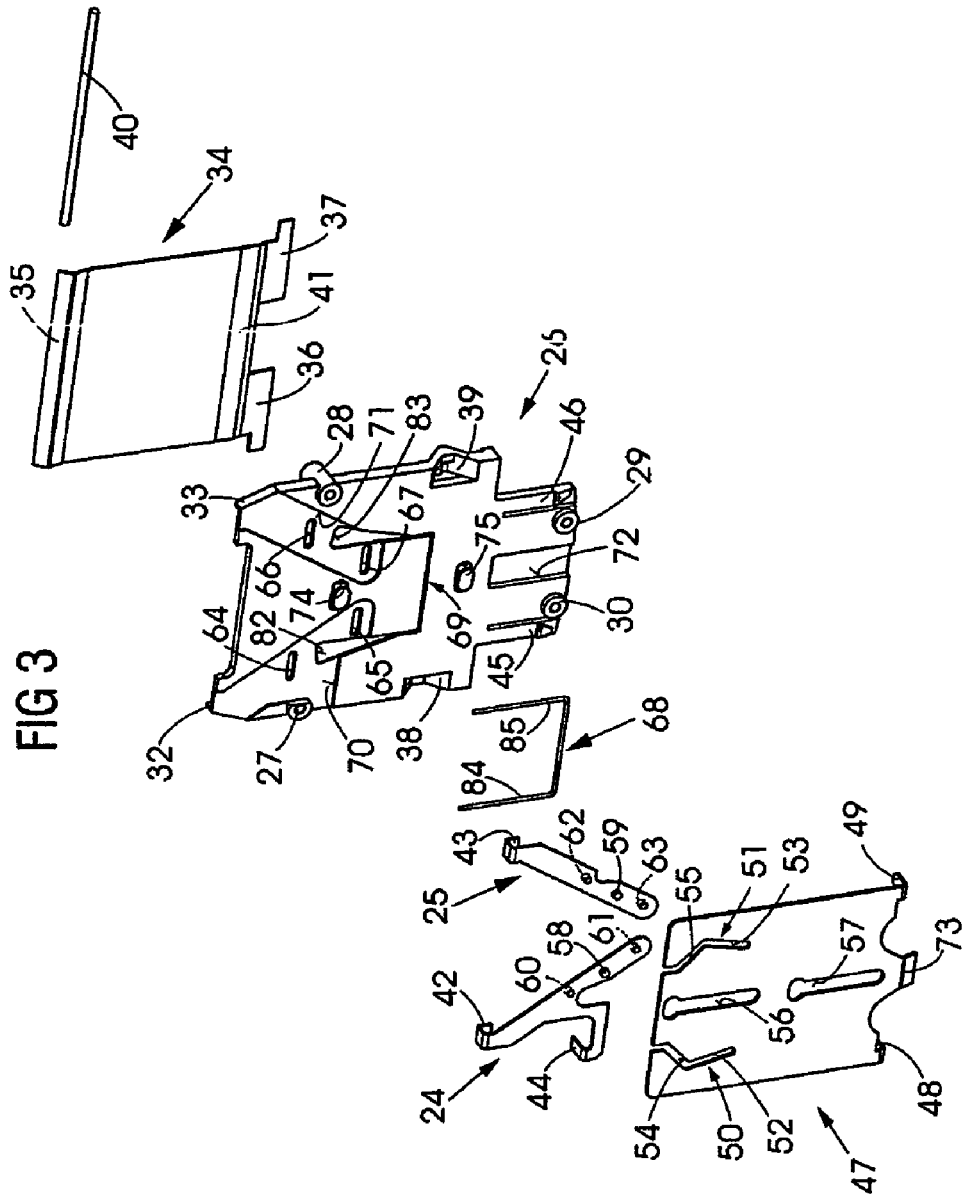
Figure 4:
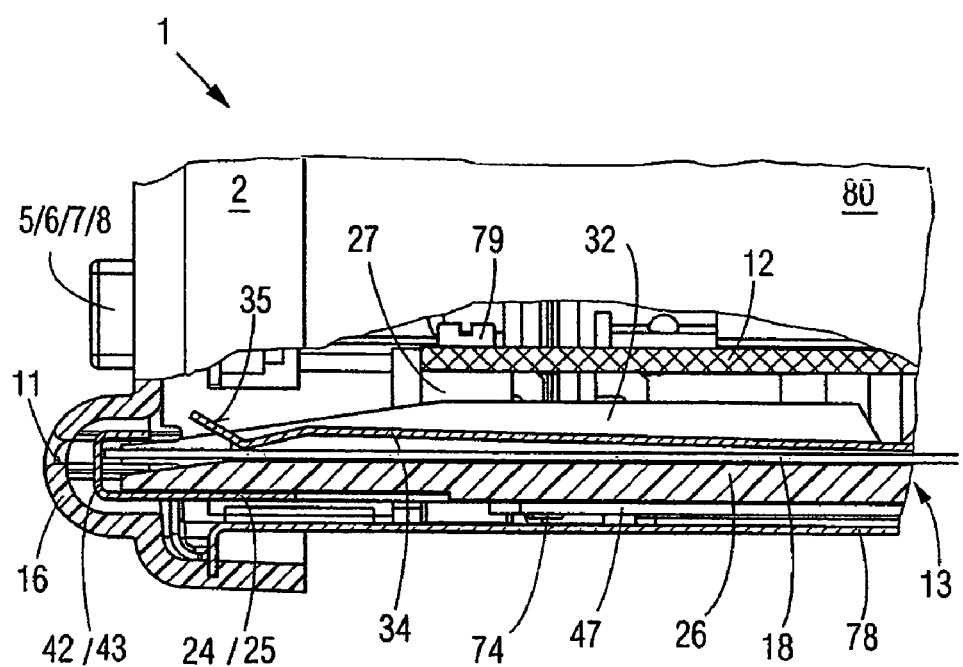
Figure 5:
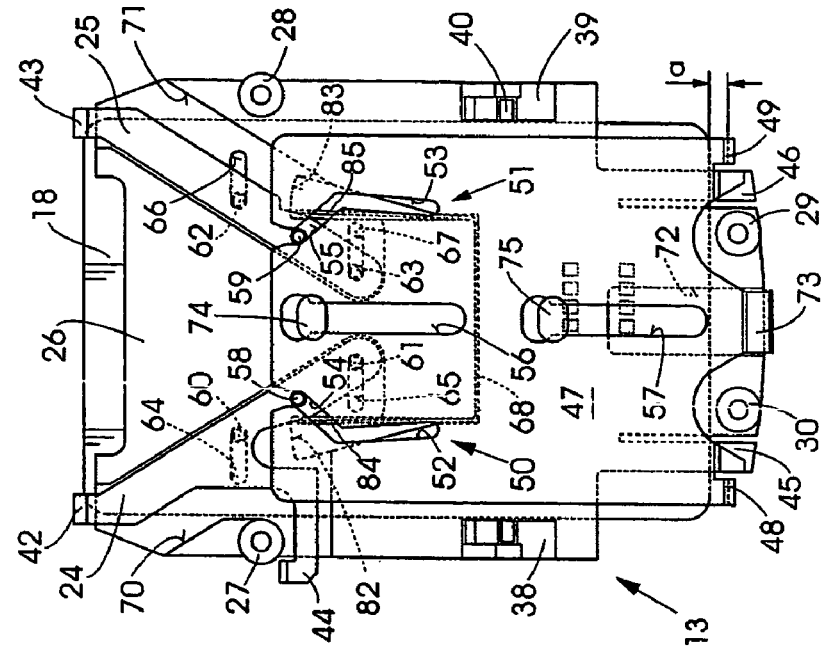
Figure 6:
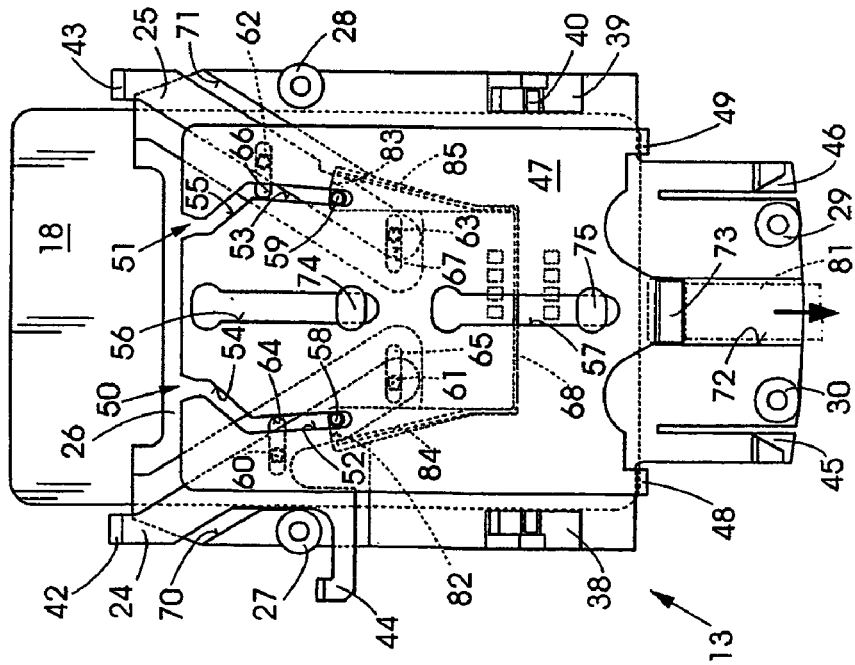

The invention is explained in more detail hereinbelow with reference to drawings, in which:

FIG. 1 shows a front view of a tachograph in which the chipcard-accommodating unit according to the invention is installed, FIG. 2 shows a perspective plan view of the chipcard-accommodating unit, FIG. 3 shows an exploded illustration of the individual components of the chipcard-accommodating unit according to FIG. 2 in a view from the rear or underside, FIG. 4 shows a partially sectional illustration of the position of the chipcard-accommodating unit between the front panel, printed circuit board and base plate of the tachograph, FIG. 5 shows a bottom view of the chipcard-accommodating unit with a chipcard located in the removal position, and FIG. 6 shows a bottom view of the chipcard-accommodating unit with a chipcard located in the reading/writing position.

DETAILED DESCRIPTION OF THE INVENTION

In FIG. 1, 1 designates a tachograph of which the built-in housing (not visible) is covered at the front by a front panel 2. 3 designates a cutout through which it is possible to read a display 4. Furthermore, a plurality of buttons 5, 6, 7 and 8 are guided out of the front panel 2. In this case, the buttons 5 and 8 serve for the task of the driver and passenger logging on, and the buttons 6 and 7, in combination with the buttons 5 and 8, serve, inter alia, for releasing the respective personal chipcards assigned to the driver and passenger. A covering 9 closes a plug socket used for diagnostic purposes. Guide slits 10 and 11 which are provided in the front panel 2 and are countersunk, in part, in a funnel-like manner serve for preliminary orientation purposes when the chipcards of the driver and passenger are introduced into the respective chipcard-accommodating units of the tachograph 1, which are located in the built-in housing, are preferably assigned to a printed circuit board 12 (FIG. 6) and of which one is illustrated in FIG. 2, by the designation 13. Clearances 14 and 15 of the bead-like protrusion 16 of the front panel 2 serve, as introduction hollows, for the preliminary insertion of the chipcards 17 and 18 into the respective reading/writing positions. A slit designated 19 is provided for the passage of the printing carrier from a document printer arranged in the tachograph 1. A button 20 serves for initiating printing. 21 designates a lead seal which secures a screw connection of the front panel 2 on the built-in housing. Also illustrated in FIG. 1 are locking elements 22, 23 and 24, 25, which are pivoted in in front of the chipcards 17, 18 and are mounted in the chipcard-accommodating units 13.

As can be gathered from FIG. 2, each chipcard-accommodating unit 13 has a card holder 26, which bears the rest of the components and on which are integrally formed threaded bolts 27, 28, 29 and 30 for fastening the chipcard-accommodating unit 13, for example, on the printed circuit board 12. 31 designates a base, and 32 and 33 designate side walls of the guide which is formed in the card holder 26 and is assigned to the chipcard 18. The actual card shaft is completed by a resilient holding-down means 34 which engages in the guide and on which an aligning rail 35, which rests on the base 31, is formed on the front side and retaining legs 36 and 37 are formed on the rear side. For the purpose of fastening or securing the holding-down means 34 on the card holder 26, bearing shells 38 and 39 are formed on the card holder 26, these bearing shells accommodating a rod 40 on which the holding-down means 34, provided with a stiffening bead 41, is supported. FIG. 2 also shows that the ends 42 and 43 of the locking elements 24 and 25, which will be described in more detail hereinbelow, are designed in a hook-like manner and can thus engage around the front side of a chipcard 18 located in the accommodating unit 13. A lug 44, which is integrally formed on one locking element 24, is part of a light barrier which indicates the presence of a chipcard 18 in the accommodating unit 13 and of which the optical elements are arranged on the printed circuit board 12. 45 and 46 designate catches which are formed, in a resilient manner, directly on the card holder 26. The catches 45 and 46 serve for securing the control slide 47 (FIG. 3), which is mounted in a displaceable manner on the card holder 26 and engages, by way of carry-along elements 48 and 49, in the movement path of a chipcard 18 guided in the accommodating unit 13.

FIG. 3 shows that the control slide 47 essentially constitutes a plate in which guide slots 50 and 51 are formed in a mirror-inverted manner in relation to a center line. In this case, one guide-slot section 52 or 53 runs parallel to the center line, or is only inclined to a slight extent in relation to the latter, and the other guide-slot section 54 or 55 is preferably at an angle of 45°. Also provided are two keyhole-like apertures 56 and 57 which, for mounting the control slide 47 such that it does not tilt, are preferably located in a row and are formed centrally in relation to the width of the control slide 47. The flat-profile locking elements 24 and 25, which are located between the control slide 47 and the card holder 26, are each provided with a carry-along pin 58 and 59 which engages with respect to the guide slot 50, 51. Also fitted on the locking elements 24, 25 are guide pins 60, 61 and 62, 63, these being assigned grooves 64, 65 and 66, 67 which are formed in the card holder 26. 68 designates a u-shaped leg spring, a gap 69 being cut out of the card holder 26 in order to fasten said leg spring in the latter. Recesses 70 and 71 serve for arranging the locking elements 24, 25 in a recessed manner in the card holder 26. A recessed section 72 constitutes a clearance for a motor-actuated push rod which, in the case of the chipcard 18 being ejected, acts on the extension 73 which is integrally formed in the center of the control slide 47. 74 and 75 designate T-shaped bearing journals which are formed on the card holder 26 and, in conjunction with the apertures 56 and 57, serve for mounting the control slide 67.

The assembly of the chipcard-accommodating unit 13 will be described hereinbelow. In this case, it is possible for the holding-down means 34 and control slide 47 to be installed completely independently of one another, in which case the two components can thus also be exchanged independently of one another. For the installation of the control slide 47, in the first instance leg spring 68 is pressed into the gap 69, which is formed in the card holder 26, and possibly caulked. Thereafter, the locking elements 24, 25 are positioned loosely in the recesses 70, 71, the guide pins 60, 61 and 62, 63 engaging in the respective grooves 64, 65 and 66, 67 and the legs of the leg spring 68 butting laterally against the locking elements 24, 25. When the control slide 47 is subsequently positioned in a bayonet-like manner on the card holder 26 such that the carry-along elements 48, 49 are oriented toward the card holder 26, the bearing journals 74, 75, in conjunction with the apertures 56, 57, engage behind the control slide 47 and the carry-along pins 58, 59 of the locking elements 24, 25 engage with the guide slots 50, 51. For the sake of completeness, it should also be mentioned that, when the control slide 47 is positioned on the card holder 26, the catches 45, 46 are pivoted. Following a short displacement path, the catches 45, 46 latch back into the movement plane of the control slide 47, i.e. the control slide 47 is secured in captive fashion on the card holder 26 and the locking elements 24, 25, which are arranged loosely between the card holder 26 and the control slide 47, are secured in their movement space by means of the control slide 47. The two-point mountings 56/74 and 57/75 of the control slide 47 here may be configured such that the control slide 47 is mounted in a largely play-free manner and tilting of the control slide 47 is also ruled out. The installation of the holding-down means 34, designed as a leaf spring, takes place in a straightforward manner by placing the holding-down means 34 on the card holder 26 and, in conjunction with the bead 41 formed on the holding-down means, by latching the rod 40 into the bearing shells 38, 39. Access to the bearing shells 38, 39 here takes place through introduction openings 76 and 77 which are cut out laterally from the bearing shells 38, 39.

FIG. 4 is intended to illustrate, in particular, the positioning of the chipcard-accommodating units 13 in relation to the printed circuit board 12, the front panel 2 and the base plate 78 of the built-in housing of the tachograph 1. FIG. 4 shows that the chipcard-accommodating unit 13 according to the invention, which is of extremely flat construction, allows a relatively low overall height between the base plate 78 of the tachograph 1 and the introduction plane of the chipcard 18, and it is thus possible to make better use of the limited overall height of the tachograph 1. In this case, the threaded bolts 27, 28, 29, 30, which are extended onto that side of the card holder 26 which is assigned to the control slide 47, serve as spacers in relation to the base plate 78. 79 designates one of the screws by which the chipcard-accommodating unit 13 is fastened on the printed circuit board 12. 80 denotes a side wall of the built-in housing of the tachograph 1.

FIGS. 5 and 6 will be used hereinbelow to explain the function of the chipcard-accommodating unit 13 according to the invention, two of these units generally being used in tachographs. FIGS. 5 and 6 show, in relation to FIG. 2 for example, bottom views each with a limit position of the functional elements. In the functional illustration of FIG. 5, the chipcard 18 is located in the removal position, into which it was displaced by means of the control slide 47 and/or the carry-along elements 48, 49 formed on the control slide 47. In this case, the control slide 47 was subjected to the action of a motor-driven push rod 81 acting on the extension 73, and this push rod, following displacement of the chipcard 18 into the removal position, was guided back into a starting position again, with the result that the chipcard-accommodating unit 13 is free for renewed introduction of the chipcard 18 or, in the case of a change of driver/passenger, for the introduction of the chipcard 17.

In this functional state, the locking elements 24, 25, or the ends 42, 43 thereof, are located outside the movement space of the chipcard 18, this movement space being bounded by the guide slit 11 located in the front panel 2 and by the card shaft formed on the card holder 26. At the same time, the legs 84 and 85 of the leg spring 68, said legs acting on the locking elements 24, 25 and moving in depressions 82 and 83 of the recesses 70, 71, are deflected to a great extent, i.e. apart from in each case a relatively small displacement brought about by the guide-slot sections 52 and 53, and are thus subjected to stressing, and the control slide 47 butts against the card holder 26, via the carry-along elements 48, 49, under the action of the legs 84, 85 of the leg spring 68 on account of the guide-slot sections 52, 53, which run in a non-parallel manner in order to guide the control slide 47.

If, in contrast to this, in the "open position" of the chipcard-accommodating unit 13, a chipcard 18 is introduced into the card shaft formed from the base 31 and the side walls 32, 33 of the card holder 26 and also from the holding-down means 34, then, upon reaching the functional state according to FIG. 5, the control slide 47 is carried along by the chipcard 18, via the carry-along elements 48, 49, until the chipcard 18 strikes against a stop (not illustrated) arranged on the printed circuit board 12 or on the set of contacts assigned to the chipcard 18, a signal of a light barrier controlled by means of the lug 44 indicating that the chipcard 18 is positioned against this stop, i.e. that the chipcard 18 is in the reading/writing position. As the control slide 47 is carried along, when the carry-along pins 58, 59 pass into the guide-slot sections 54, 55, the locking elements 24, 25 are displaced such that the hook-like ends 42, 43 of the locking elements engage around the end surface of the chipcard 18. It is possible here, as can be gathered from FIG. 6, for the components which are coupled to one another in terms of gearing to be coordinated such that the locking elements 24, 25 engage in a largely play-free manner around the chipcard 18 lying against the stop and, in this way, secure the chipcard 18 in the reading/writing position. This means that the control slide 47 has to execute a degree of overtravel "a" in order that, when the chipcard 18 is ejected by the push rod 81, the locking elements 24, 25 can be displaced in the first instance, and it is only then that the chipcard 18 is carried along via the carry-along elements 48, 49. This means, furthermore, that the leg spring 68 has to be designed such that it has to be capable, independently of the chipcard 18 being pushed into the reading/writing position, of automatically bringing about the overtravel of the control slide 47 and, in the process, of displacing the locking elements 24, 25 in front of the chipcard 18. Conversely, sufficient spacing is necessary between the locking elements 24, 25 and the chipcard 18 located against the stop in order to avoid collision during the simultaneous pushing-out action of the chipcard 18 and displacement of the locking elements 24, 25. Since the chipcard 18 is, in fact, fixed in the reading/writing position to a sufficient extent by the holding-down means 34, the leg spring 68 in this case may be designed such that it is sufficient for stopping the locking elements 24, 25 and the control slide 47 from vibrating; if appropriate, it is also possible to dispense with the leg spring 68.

We claim:

1. A chipcard-accommodating unit, comprising:
a card holder for guiding chipcards;
locking means arranged to be actuated by means of a chipcard when the chipcard is introduced into the accommodating unit;
a plate control slide arranged to be displaced by means of a chipcard, the slide being mounted on the card holder such that the control slide engages, via gearing, with at least one locking element mounted on the card holder, the locking element being designed and mounted such that the locking element can be moved in a plane parallel to the movement plane of the control slide and the locking element further ranged to engage, by way of an integrally formed tongue, in the movement plane of the chipcard, and
a bayonet connecting means arranged to facilitate installing of the control slide and mounting the slide on the card holder.

2. The chipcard-accommodating unit according to claim 1, wherein the locking element comprises an essentially flat profile with the tongue integrally formed at one end, and wherein the locking element comprises mounting means for mounting the locking element on the card holder, and a carry-along pin which is assigned a guide slot formed in the control slide.

3. The chipcard-accommodating unit according to claim 2, further comprising guide slots are assigned to the at least one locking element the slots arranged such that hook ends of the at least one locking element abuts against an end side of the chipcard under the action of a leg spring when the chipcard is located in the reading/writing position.

4. The chipcard-accommodating unit according to claim 2, wherein the guide slots comprise means for latching the control slide.

5. The chipcard-accommodating unit according to claim 1, further comprising two locking elements including guide slots assigned thereto, the guide slots formed in the control slide and configured such that the locking elements move in opposite directions when the control slide is moved.

6. The chipcard-accommodating unit according to claim 5, wherein the locking elements are mounted between the card holder and the control slide in recesses formed in the card holder, such that the locking elements can be pivoted or displaced transversely to the direction of movement of the control slide.

7. The chipcard-accommodating unit according to claim 6, wherein each locking element is assigned a spring element.

8. The chipcard-accommodating unit according to claim 7, further comprising an essentially u-shaped leg spring fastened on the card holder whereby each leg of the leg spring engages in one of the recesses of the card holder.

9. The chipcard-accommodating unit according to claim 6, wherein each locking element comprises guide pins fitted on opposite sides of a carry-along pin, and grooves assigned to the guide pins are formed in the card holder such that the locking elements can be moved transversely to a movement direction of the control slide.

10. The chipcard-accommodating unit according to claim 7, further comprising a bayonet connecting means, positioned between the card holder and the control slide, and a guide and drive means of locking elements, the connecting means and guide and drive means arranged such that when a chipcard strikes against a stop in the reading/writing position, the control slide executes a degree of over travel under an action of a leg spring.

11. The chipcard-accommodating unit according to claim 1, wherein one end of the locking element comprises hook shape arranged to engage around an end side of a chipcard located in the reading/writing position.

12. The chipcard-accommodating unit according to claim 1, further comprising at least one resilient catch formed on the card holder and arranged to secure a connection between the card holder and the control slide.

13. The chipcard-accommodating unit according to claim 1, wherein the control slide comprises at least one aperture arranged for a bayonet connection to the card holder, the aperture being essentially centrally arranged with respect to the mirror-inverted guide slots, the guide slots being assigned to the locking elements.

14. The chipcard-accommodating unit according to claim 13, wherein the control slide comprises two apertures located in a row in the movement direction of the control slide, and the T-shaped bearing journals corresponding to the apertures are formed on the card holder.

15. The chipcard-accommodating unit according to claim 1, wherein the bayonet-type connecting means comprises a T-shaped bearing journal in cross section transverse to a movement direction of the control slide.

* * * * *